(12) United States Patent
Richter et al.

(10) Patent No.: US 7,603,502 B2
(45) Date of Patent: Oct. 13, 2009

(54) RESOURCE ACCESSING WITH LOCKING

(75) Inventors: Jeffrey M. Richter, Clyde Hill, WA (US); Jason D. Clark, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/103,854

(22) Filed: Apr. 12, 2005

(65) Prior Publication Data
US 2006/0230411 A1 Oct. 12, 2006

(51) Int. Cl.
*G06F 12/00* (2006.01)
(52) U.S. Cl. ..................................... 710/200
(58) Field of Classification Search ................ 710/260, 710/112, 240, 6, 200; 711/152; 718/104
See application file for complete search history.

(56) References Cited

U.S. PATENT DOCUMENTS

| | | | |
|---|---|---|---|
| 4,716,528 A | 12/1987 | Crus et al. | |
| 4,965,718 A * | 10/1990 | George et al. | 718/104 |
| 6,101,569 A | 8/2000 | Miyamoto et al. | |
| 6,112,222 A | 8/2000 | Govindaraju et al. | |
| 6,247,025 B1 | 6/2001 | Bacon | |
| 6,546,443 B1 | 4/2003 | Kakivaya et al. | |
| 6,598,068 B1 * | 7/2003 | Clark | 718/104 |
| 6,604,160 B1 * | 8/2003 | Le et al. | 710/240 |
| 6,668,279 B1 * | 12/2003 | Curtis | 709/218 |
| 6,721,775 B1 * | 4/2004 | Fagen et al. | 718/100 |
| 6,738,974 B1 | 5/2004 | Nageswaran et al. | |
| 6,779,089 B2 * | 8/2004 | Lin et al. | 711/152 |
| 6,792,601 B1 | 9/2004 | Dimpsey et al. | |
| 6,910,212 B2 * | 6/2005 | Brenner et al. | 718/104 |
| 7,047,322 B1 * | 5/2006 | Bauman et al. | 710/6 |
| 7,058,948 B2 * | 6/2006 | Hoyle | 718/104 |
| 7,080,060 B2 * | 7/2006 | Sorrentino et al. | 707/1 |
| 7,080,174 B1 * | 7/2006 | Thorsbakken et al. | 710/112 |
| 2006/0225078 A1 * | 10/2006 | Anderson | 718/104 |

OTHER PUBLICATIONS

"Lock reservation:Java Locks Can Mostly Do Without Atomic Operations", Kawachiya et al. SIGPLAN Notices, vol. 37, No. 11, Nov. 2002, pp. 130-141.
"A Comparison of the Concurrency and Real-Time Features of Ada 95 and Java", Brosgol, B.M., Ada User Journal, vol. 19, No. 4, Jan. 1999, pp. 225-257.
"Wait-free cache-affinity thread scheduling", Debattista et al., IEEE Proceedings- Software, vol. 150, No. 2, Apr. 2003, pp. 137-146.

* cited by examiner

*Primary Examiner*—Thomas Lee
*Assistant Examiner*—Mohammed H Rehman
(74) *Attorney, Agent, or Firm*—Lee & Hayes, PLLC

(57) ABSTRACT

Thread usage is managed when locking resources during the possibly-contentious accessing of such resources. In a described implementation, a thread that is executing a corresponding access request is not suspended when its corresponding access request is delayed because a targeted resource is currently locked for accessing by another thread. Instead, when a targeted resource is locked, the blocked access request is queued up in a queue of access requests. The corresponding thread is then permitted to perform other work. When the resource is subsequently unlocked and thus becomes available, an access request (e.g., the oldest or highest priority access request) that is queued is retrieved, and a thread is allowed to execute it. Implementations for general locking access schemes, for read/write-bifurcated locking access schemes, etc. are described. Implementations are described from conceptual, functional, temporal, code or function, contention, thread, and other perspectives.

19 Claims, 14 Drawing Sheets

WRITETORESOURCE (WTR)

RESOURCE ACCESSING WITH LOCKING

TECHNICAL FIELD

This disclosure relates in general to accessing a resource and in particular, by way of example but not limitation, to locking a resource during the accessing thereof in the context of thread management.

BACKGROUND

In electronic devices and computer networks generally, many resources are shared or are otherwise subject to multiple access requests. Some mechanism is usually employed to handle these multiple access requests without causing data corruption and/or other errors due to uncoordinated accessing and unmanaged interference. The mechanism that is usually employed is a locking mechanism.

FIG. 1 illustrates an existing general locking scheme for accessing resources. A device 101 includes a resource 103. Resource 103 is, by way of example, a database. Device 101 also includes an acquire lock (AL) function 105 and a release lock (RL) function 107. Acquire lock 105 and release lock 107 facilitate the acquisition and release, respectively, of locks on resource 103 during the servicing of access requests 109.

A legend for FIG. 1 indicates that threads are represented by diagonal squiggly lines and that APIs are represented by rectangles. Hence, acquire lock 105 and release lock 107 are APIs. Access requests 109, on the other hand, are represented by squares. Access requests 109 include access request 109 (1), access request 109(2), and access request 109(3).

At (1), acquire lock 105 enables a lock to be secured on resource 103 for access request 109(1) on behalf of the thread thereof. At (2), the thread of access request 109(1) accesses resource 103. At some point after a lock is secured on resource 103 at (1), access request 109(2) is accepted by acquire lock 105. Because resource 103 is already locked, the thread of access request 109(2) is suspended at (3). Similarly, when access request 109(3) is received, acquire lock 105 also causes the thread of access request 109(3) to be suspended at (4).

When the thread of access request 109(1) completes the accessing of resource 103, release lock 107 releases the access lock on resource 103. At (5), release lock 107 causes a thread that has been suspended to be awakened so that the access request 109 thereof may be serviced by enabling access to resource 103. With this general locking scheme of FIG. 1, resource 103 may be locked regardless of whether an access request 109 is a read from or a write to resource 103.

FIG. 2 illustrates an existing reader/writer locking scheme for accessing resources. Device 101 again includes resource 103. However, acquire lock 105 and release lock 107 are divided into read and write logic. Specifically, acquire lock 105 is divided into acquire reader lock (ARL) 105(R) and acquire writer lock (AWL) 105(W). Release lock 107 is divided into release reader lock (RRL) 107(R) and release writer lock (RWL) 107(W).

Access requests 109 are also divided into read access requests 109(R) and write access requests 109(W). Specifically, two read access requests 109(R1) and 109(R2) and two write access requests 109(W1) and 109(W2) are shown. Because read access requests 109(R) do not modify resource 103, multiple read access requests 109(R) may be concurrently serviced. Hence, at (1) multiple concurrent reads are permitted by acquire reader lock 105(R).

While resource 103 is locked to service one or more reads, threads of write access requests 109(W) are suspended at (2) by acquire writer lock 105(W). The completion of all reads is awaited at (3). After all reads are completed, release reader lock 107(R) releases the lock on resource 103 and at (4) awakens a previously-suspended write thread.

At block (5), a thread for write access request 109(W1) is awakened. Acquire writer lock 105(W) locks resource 103 at (6). At (7), write access request 109(W1) writes to resource 103. Upon completion of the write, release writer lock 107 (W) unlocks resource 103 and at (8) awakens the thread for the next write request 109(W) (e.g., write access request 109(W2)). Although this reader/writer locking scheme enables concurrent read accesses to expedite the overall handling of both read and write access requests 109, it still entails significant overhead.

Accordingly, there is a need for schemes, mechanisms, techniques, etc. that can efficiently facilitate the handling of access requests while reducing attendant processing overhead.

SUMMARY

Thread usage is managed when locking resources during the possibly-contentious accessing of such resources. In a described implementation, a thread that is executing a corresponding access request is not suspended when its corresponding access request is delayed because a targeted resource is currently locked for accessing by another thread. Instead, when a targeted resource is locked, the blocked access request is queued up in a queue of access requests. The corresponding thread is then permitted to perform other work. When the resource is subsequently unlocked and thus becomes available, an access request (e.g., the oldest or highest priority access request) that is queued is retrieved, and a thread is allowed to execute it. Implementations for general locking access schemes, for read/write-bifurcated locking access schemes, etc. are described. Implementations are described from conceptual, functional, temporal, code or function, contention, thread, and other perspectives.

Other method, system, approach, apparatus, device, media, procedure, API, arrangement, etc. implementations are described herein.

BRIEF DESCRIPTION OF THE DRAWINGS

The same numbers are used throughout the drawings to reference like and/or corresponding aspects, features, and components.

FIG. 1 illustrates an existing general locking scheme for accessing resources.

FIG. 2 illustrates an existing reader/writer locking scheme for accessing resources.

FIG. 3 illustrates an example of a general locking scheme for accessing resources in which a thread is not suspended.

FIG. 4 illustrates an example of a reader/writer locking scheme for accessing resources in which a thread is not suspended.

FIG. 5 illustrates an example of resource locking for non-contention scenarios from a primarily functional and temporal perspective.

FIG. 6 illustrates an example of resource locking for contention scenarios from a primarily functional and temporal perspective.

FIG. 7 is a block diagram of example functional units for a resource locking implementation that is bifurcated between reads and writes.

DETAILED DESCRIPTION

Introduction

As described herein above, existing schemes that lock resources during the accessing thereof suspend a given thread that is executing an access request until the resource is free and it is the given thread's turn to access the resource. This forces the thread to sit idle for some period of time. During this idle time period, the thread is not able to perform work by executing code. Additionally, maintaining the thread, even in a suspended state, occupies system resources. Moreover, switching between threads (termed "context switching") consumes processing resources and introduces processing delays.

In a described implementation, on the other hand, a thread that is executing an access request is not suspended. The thread is not suspended even when the corresponding access request is delayed because a targeted resource is currently locked for accessing by another thread for its corresponding access request. When a targeted resource is locked, the blocked access request is queued up in a queue of access requests, and the thread is permitted to perform other work. When the resource is unlocked and becomes available, an access request (e.g., the oldest or highest priority access request) that is queued is retrieved, and a thread is assigned to execute it.

Resource Accessing Locking Scheme without Thread Suspension

Figure 1:
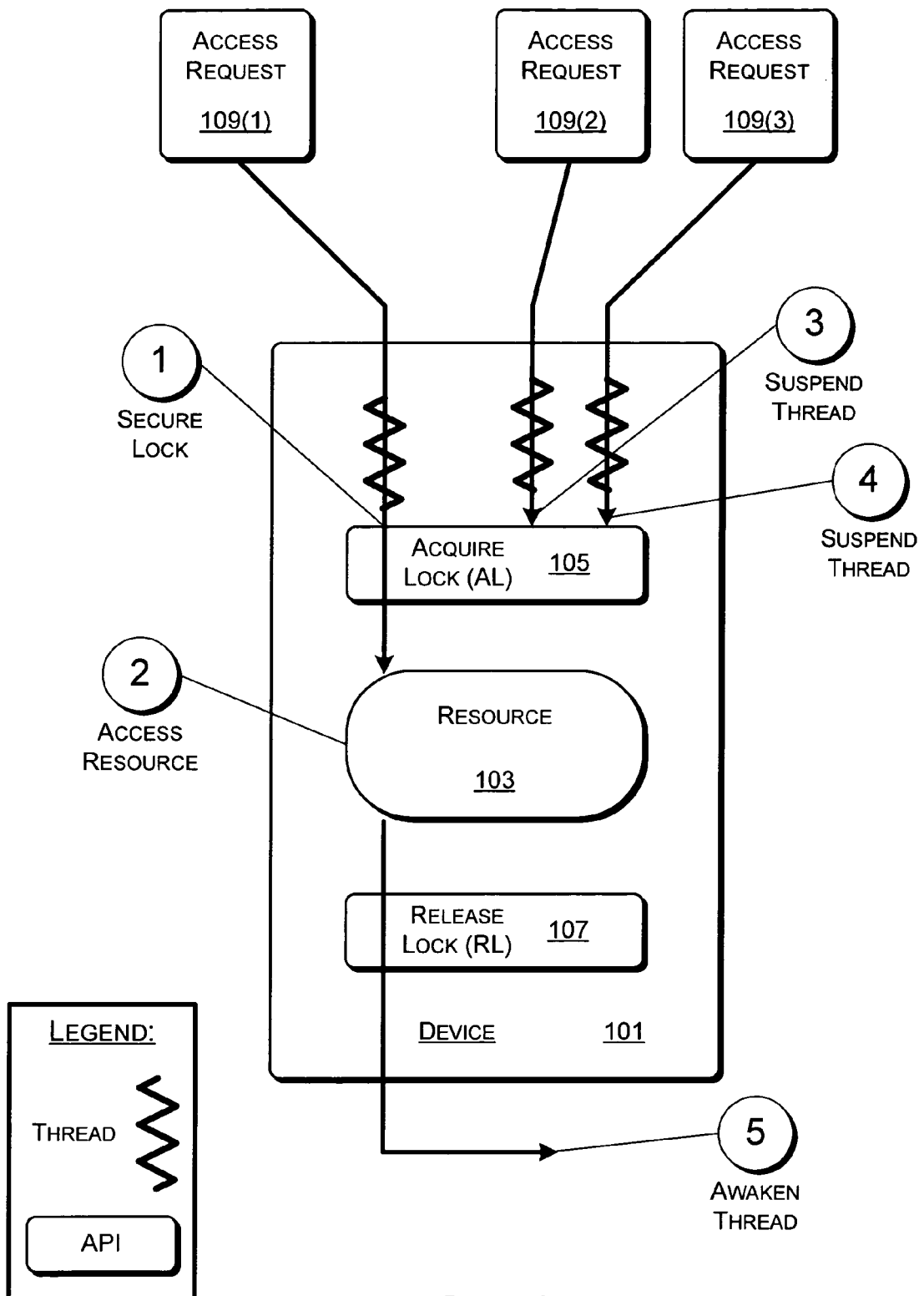
Figure 2:
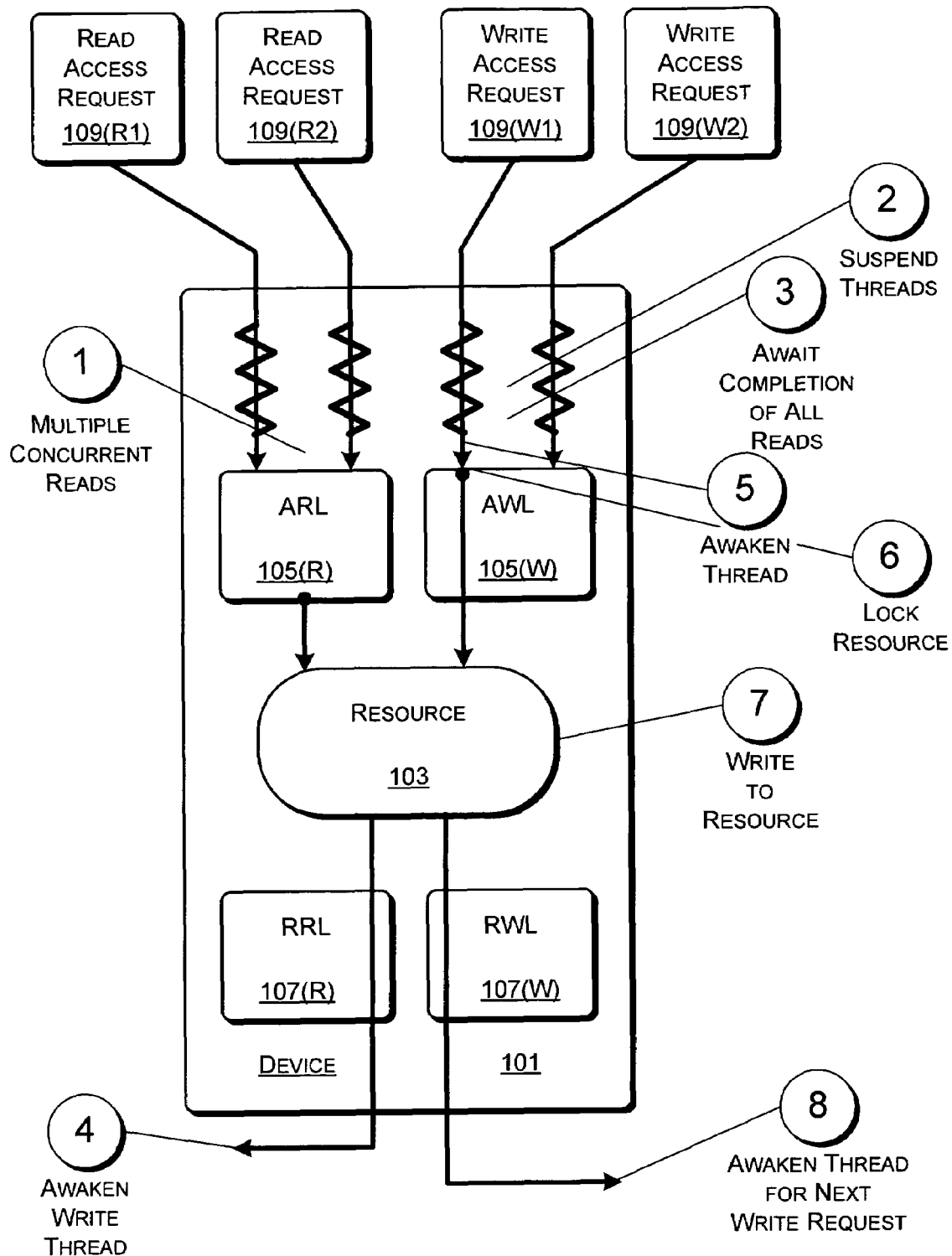
Figure 3:
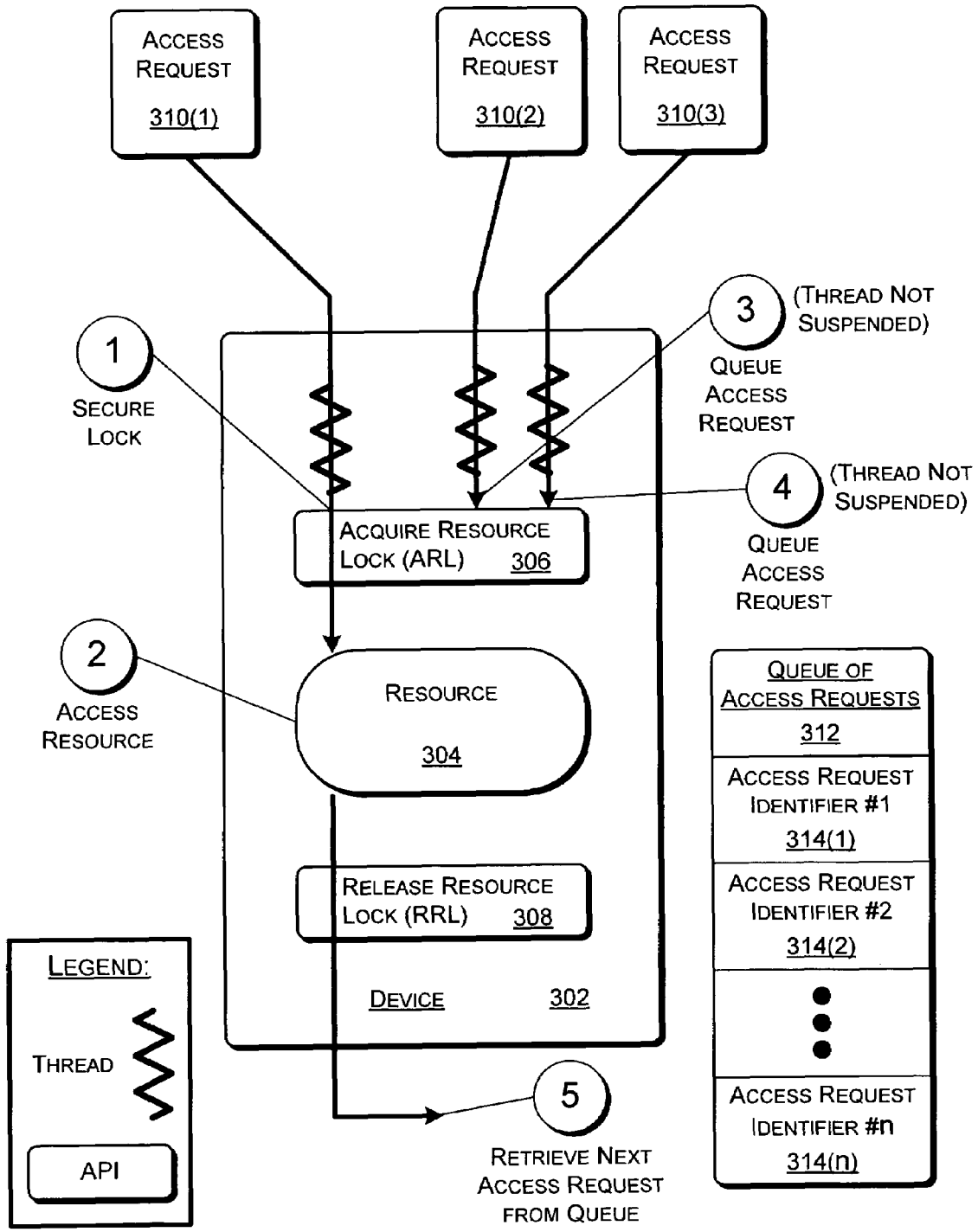

FIG. 3 illustrates an example of a general locking scheme for accessing resources in which a thread is not suspended. A device 302 includes a resource 304. Resource 304 may be any resource at a component level, a device level, a system level, a network level, and so forth. Examples of a resource 304 include, by way of example but not limitation, a file, a database, a bus, a memory module, a document, a printer, a network connection, a video processor and/or display screen, and so forth.

Device 302 also includes an acquire resource lock (ARL) function 306 and a release resource lock (RRL) function 308. Acquire resource lock 306 and release resource lock 308 facilitate the acquisition and release, respectively, of locks on resource 304 during the servicing of access requests 310. The general locking scheme of FIG. 3 effectively implements a mutually exclusive or mutex type of lock.

A legend for FIG. 3 indicates that threads are represented by diagonal squiggly lines and that APIs are represented by rectangles. Hence, acquire resource lock 306 and release resource lock 308 may be realized and exposed as APIs in a described implementation. Access requests 310, on the other hand, are represented by squares instead of rectangles. Each access request 310 is a request for some kind of access to resource 304.

As illustrated, access requests 310 include access request 310(1), access request 310(2), and access request 310(3). At (1), a lock on resource 304 is secured for access request 310(1) by acquire resource lock 306 on behalf of the thread corresponding thereto. At (2), the thread corresponding to access request 310(1) performs work by accessing resource 304 in accordance with the request of access request 310(1).

Meanwhile, one or more other access requests 310 can be received at acquire resource lock 306. Access requests 310(2) and 310(3) are also received at acquire resource lock 306. In a described implementation, such subsequent access requests 310 may be received at any time between when acquire resource lock 306 first begins to handle access request 310(1) and when the lock is ultimately released (e.g., by release resource lock 308). Alternatively, this time frame may be limited or otherwise changed.

Regardless, when acquire resource lock 306 receives an access request 310 while resource 304 is already locked, acquire resource lock 306 does not suspend the thread corresponding thereto. Instead, the received access request 310 is queued for subsequent handling. The thread corresponding to the received access request 310 can therefore be released and freed to perform other work. Also, the state and/or context information for the thread does not need to be maintained by device 302. Additionally, context switching can be reduced or even eliminated. Any or all of these consequences can increase the processing efficiency and/or improve the overall performance of resource 304 and/or device 302.

At (3), the thread corresponding to access request 310(2) is not suspended, and acquire resource lock 306 queues access request 310(2). Similarly, at (4) the thread corresponding to access request 310(3) is not suspended, and acquire resource lock 306 queues access request 310(3). Access requests 310 (2) and 310(3) are queued in queue of access requests 312 by acquire resource lock 306.

In a described implementation, queue of access requests 312 includes one or more access request identifiers 314. Queue of access requests 312 may be realized, for example, as a first-in first-out (FIFO) queue, a linked list, items on a stack, some combination thereof, and so forth. Each respective access request identifier 314 identifies an associated respective access request 310. This identification may be a code, a pointer, an address, a function name or location, some combination thereof, and so forth.

As illustrated, queue of access requests 312 includes "n" access request identifiers 314(1 . . . n). Specifically, queue of access requests 312 includes an access request identifier #1 314(1), an access request identifier #2 314(2) . . . and an access request identifier #n 314(n). If, for example, queue of access requests 312 is realized as a FIFO queue with access request identifier 314(1) being the newest entry and access request identifier 314(n) being the oldest entry, then access request identifier #2 314(2) is associated with access request 310(2), and access request identifier #1 314(1) is associated with access request 310(3).

Access requests 310 can therefore be handled as locks are released without having one or more threads being suspended by referring to queue of access requests 312. At (5), when the lock on resource 304 for access request 310(1) is released by release resource lock 308, the next access request 310 is retrieved from queue of access requests 312. This retrieval may be effectuated by release resource lock 308 and/or acquire resource lock 306. Specifically, in this example, access request identifier #n 314(n) is retrieved from queue of access requests 312 because it is the oldest entry in the queue. The access request 310 that is associated with access request identifier #n 314(n) is then handled by acquire resource lock 306.

The general locking scheme of FIG. 3 may be implemented in any of many possible alternative manners. For example, queue of access requests 312 may be located within device 302 or may be external thereto. Additionally, although access requests 310 are shown as arriving at device 302 from an external source, access requests 310 may instead originate internal to device 302.

Figure 4:
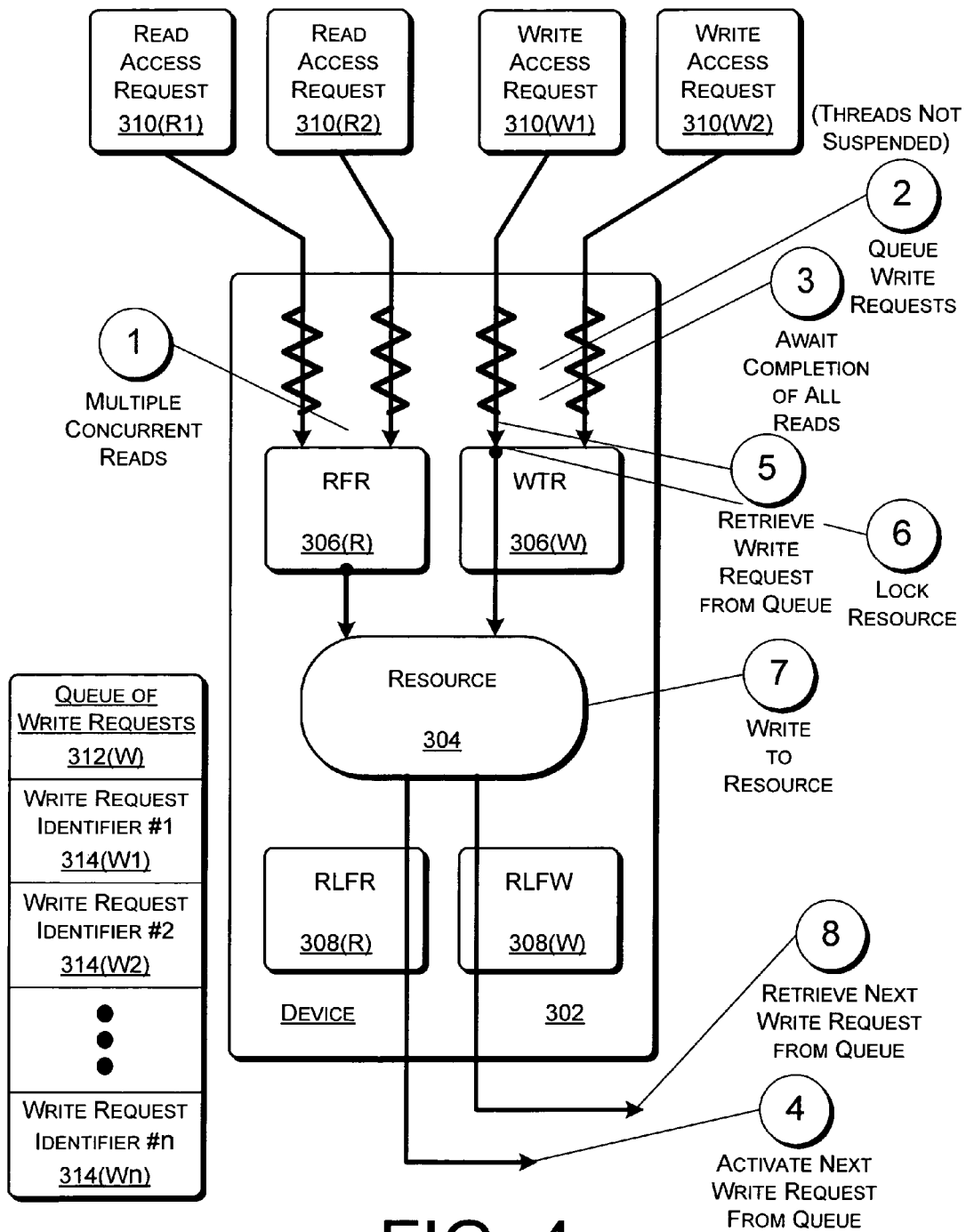

FIG. 4 illustrates an example of a reader/writer locking scheme for accessing resources in which a thread is not suspended. Device 302 again includes resource 304. However, acquire resource lock 306 and release resource lock 308 are at least partially bifurcated into read and write logic. Specifically, acquire resource lock 306 is bifurcated into read from resource (RFR) 306(R) and write to resource (WTR) 306(W). Release resource lock 308 is bifurcated into release lock for reads (RLFR) 308(R) and release lock for writes (RLFW) 308(W).

Access requests 310 are also bifurcated into read access requests 310(R) and write access requests 310(W). Specifically, two read access requests 310(R1) and 310(R2) and two write access requests 310(W1) and 310(W2) are shown. Because read access requests 310(R) do not modify resource 304, multiple read access requests 310(R) may be concurrently serviced. Hence, at (1) multiple concurrent reads are permitted by read from resource 306(R).

While resource 304 is locked to service one or more read accesses, threads corresponding to write access requests 310 (W) are not suspended by write to resource 306(W). Instead, write access requests 310(W) are queued up in queue of write requests 312(W). In a described implementation, queue of write requests 312(W) includes one or more write request identifiers 314(W). As illustrated, queue of write requests 312(W) includes "n" write request identifiers 314(W1 ... Wn). Specifically, queue of write requests 312(W) includes a write request identifier #1 314(W1), a write request identifier #2 314(W2) ... and a write request identifier #n 314(Wn).

At (2), instead of suspending the threads corresponding to write access requests 310(W), write to resource 306(W) queues write request identifiers 314(W) in queue of write requests 312(W). The completion of all read accesses is awaited at (3).

At (4), when all of the one or more read access requests 310(R) are completed, release lock for reads 308(R) releases the read lock on resource 304, and release lock for reads 308(R) and/or release lock for writes 308(W) activates the next write access request 310(W) from queue of write requests 312(W).

At (5), write to resource 306(W) retrieves the next write access request 310(W) from queue of write requests 312(W). Specifically, the next (e.g., in terms of temporal and/or priority primacy) write request identifier 314(W) is retrieved from queue of write requests 312(W), and the associated write access request 310(W) (e.g., write access request 310(W1)) is handled.

At (6), resource 304 is locked by write to resource 306(W). At (7), the thread corresponding to write access request 310 (W1) performs work by writing to resource 304 in accordance with the write request of write access request 310(W1).

At (8) when the write is completed, release lock for writes 308(W) releases the write lock on resource 304 and activates the next write access request 310(W) of queue of write requests 312(W). Release lock for writes 308(W) and/or write to resource 306(W) may actually retrieve the next write request identifier 314(W) from queue of write requests 312 (W).

With the reader/writer locking scheme of FIG. 4, concurrent reading is enabled while the overhead of thread suspension is avoided. Handling read and write requests without suspending request-handling threads can also be described in terms of no contention versus contention scenarios. In other words, the manner in which read and write requests are handled can depend on whether there is contention for the target resource.

Figure 5:
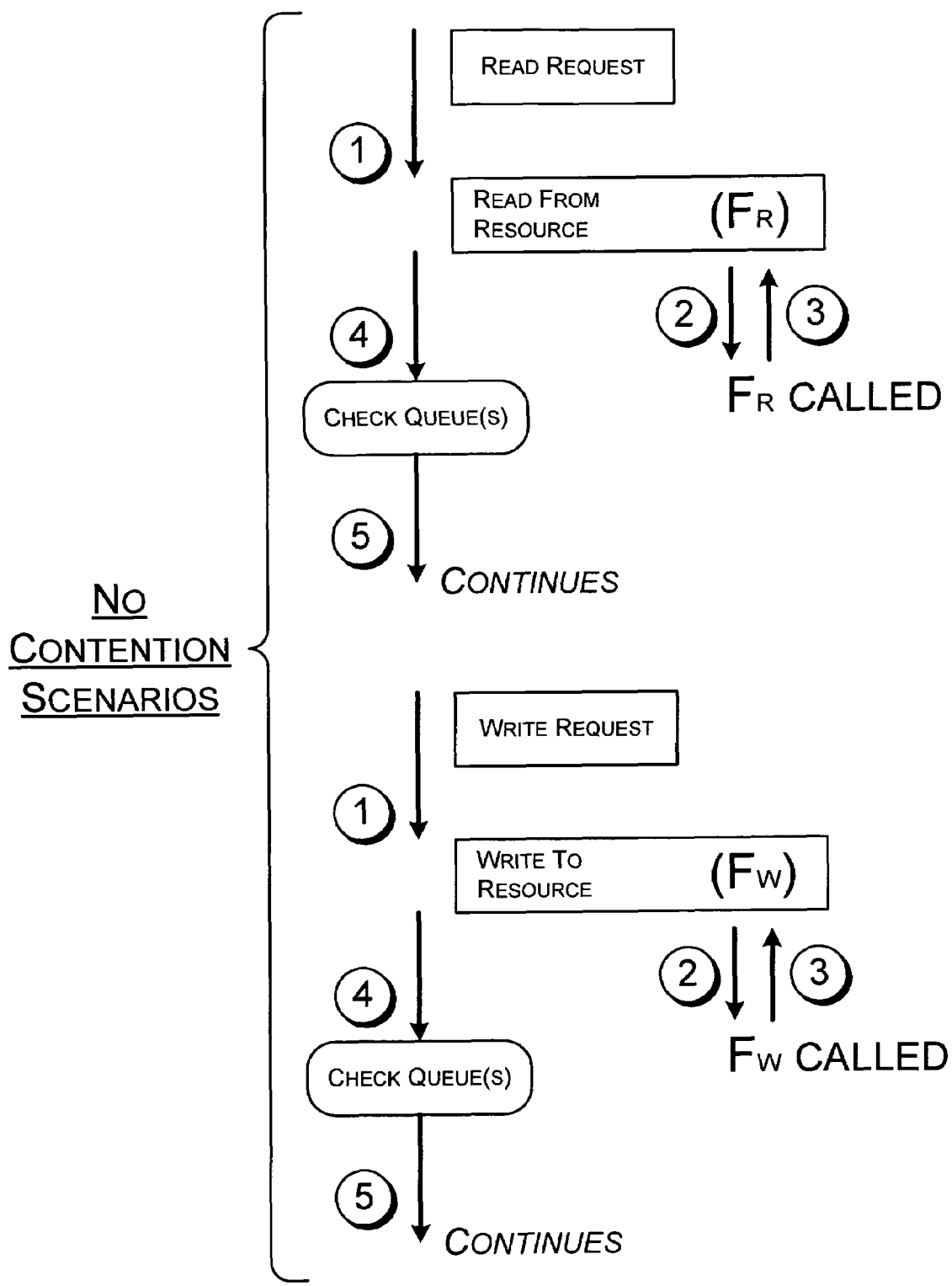

FIG. 5 illustrates an example of resource locking for non-contention scenarios from a primarily functional and temporal perspective. The top example is directed to handling a read request, and the lower example is directed to handling a write request. For the read request example, at (1) a reading function is passed to a read from resource function. At (2), the reading function is called. At (3), the reading function returns. At (4), at least one queue for pending reads and/or pending writes is checked. At (5), the request handling process continues.

For the write request example, at (1) a writing function is passed to a write to resource function. At (2), the writing function is called. At (3), the writing function returns. At (4), at least one queue for pending reads and/or pending writes is checked. At (5), the request handling process continues. As is described more fully herein below with particular reference to FIG. 8, a single thread can perform all of the requisite work for handling a read request or a write request in a no contention scenario. Also, the request-handling thread is not suspended.

Figure 6:
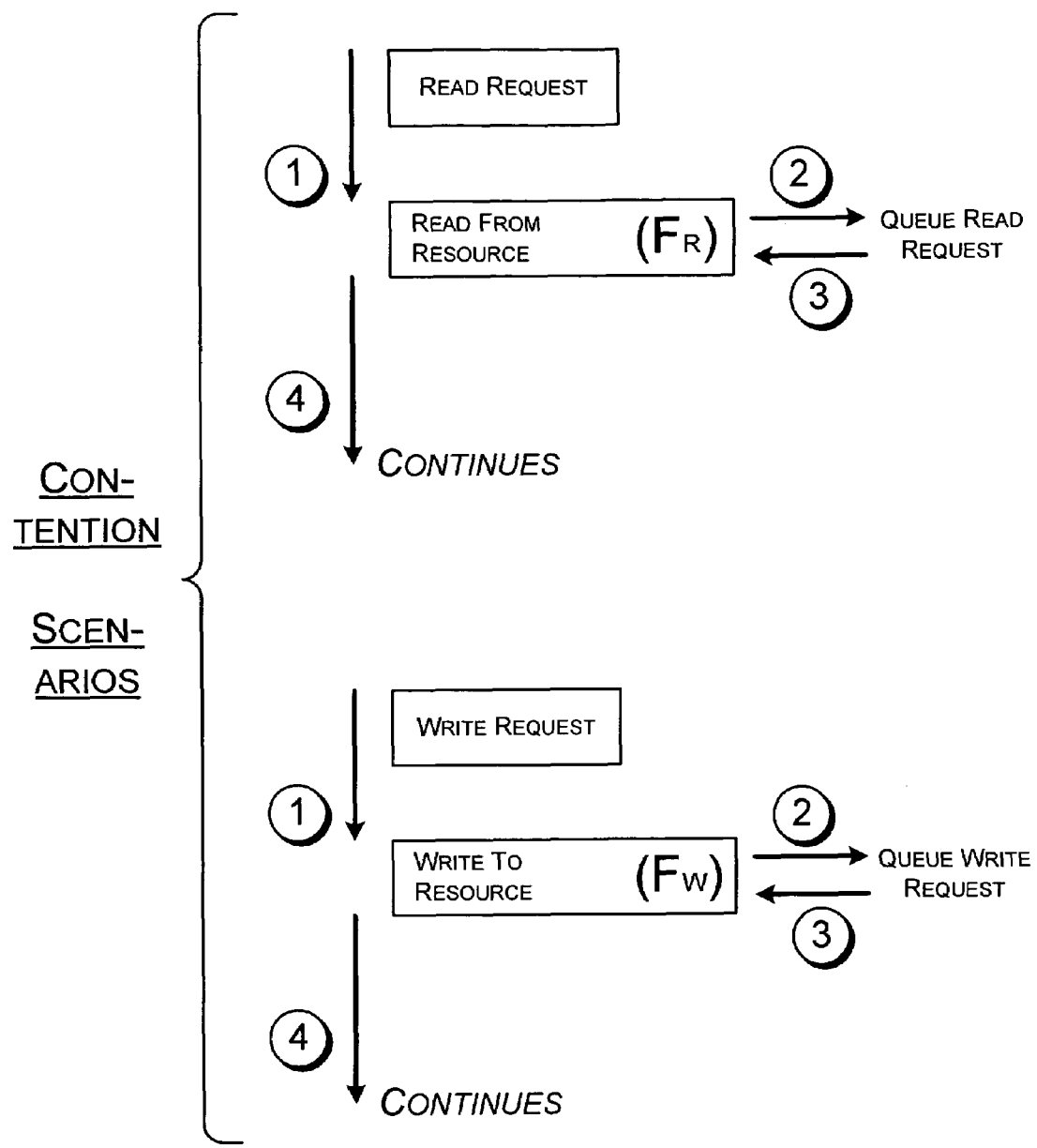

FIG. 6 illustrates an example of resource locking for contention scenarios from a primarily functional and temporal perspective. Again, the top example is directed to handling a read request, and the lower example is directed to handling a write request. For the read request example, at (1) a reading function is passed to a read from resource function. At (2), the read request is queued, but the request-handling thread is not suspended. At (3), the function returns. At (4), the request handling process continues.

For the write request example, at (1) a writing function is passed to a write to resource function. At (2), the write request is queued, but the request-handling thread is not suspended. At (3), the function returns. At (4), the request handling process continues.

As is described more fully herein below with particular reference to FIG. 9, at least two threads may be required for accomplishing all of the requisite work for handling a single read request or a single write request in a contention scenario. However, because the request-handling thread is not suspended, significant attendant thread management overhead is avoided.

Although only a single (e.g., write-oriented) request queue is illustrated in FIG. 4 and described in conjunction therewith, one or more queues may be implemented differently. For example, a single queue may hold both pending read requests and pending write requests. Alternatively, there may be one queue for pending read requests and another queue for pending write requests.

Figure 7:
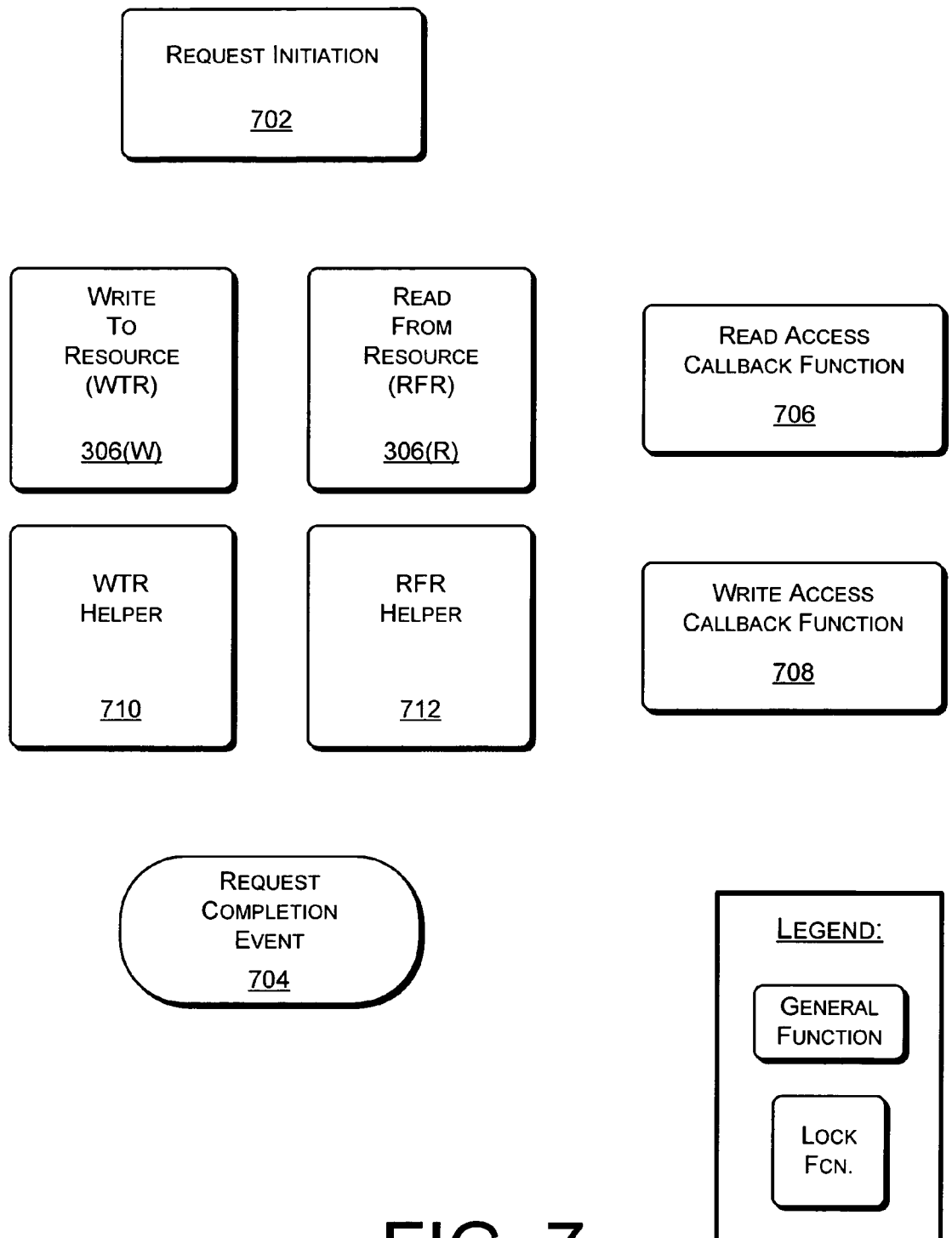

Reader/Writer Lock Implementation Example(s) with Respect to Functions and Threads FIG. 7 is a block diagram of example functional units for a resource locking implementation that is bifurcated between reads and writes. As indicated by a legend for FIG. 7, rectangular blocks represent general or user functions, and square blocks represent lock-related functions. As illustrated, general functions include a request initiation function 702, a read access callback function 706, and a write access callback function 708. A request completion event 704 is also illustrated.

These example general functions may be designed and provided by a user, for instance. The two example access callback functions 706 and 708 are indicative of many possible types of specific functions that enable specific types of accessing of a given resource. Other examples (in addition to read and write) include access, query, modify, manipulate, set, some combination thereof, and so forth.

In a described implementation, lock-specific functions include write to resource (WTR) function 306(W), read from resource (RFR) function 306(R), WTR helper function 710, and RFR helper function 712. Write to resource 306(W) and read from resource 306(R) are described herein both above and below. WTR helper 710 and RFR helper 712 are described further herein below with particular reference to FIGS. 8-13.

The lock-related functions can be implemented as APIs. Moreover, they can be categorized (i) as public or user-available APIs or (ii) as private or internal APIs. In a described implementation, write to resource 306(W) and read from resource 306(R) are implemented as public functions, and WTR helper 710 and RFR helper 712 are implemented as internal functions.

Figure 8:
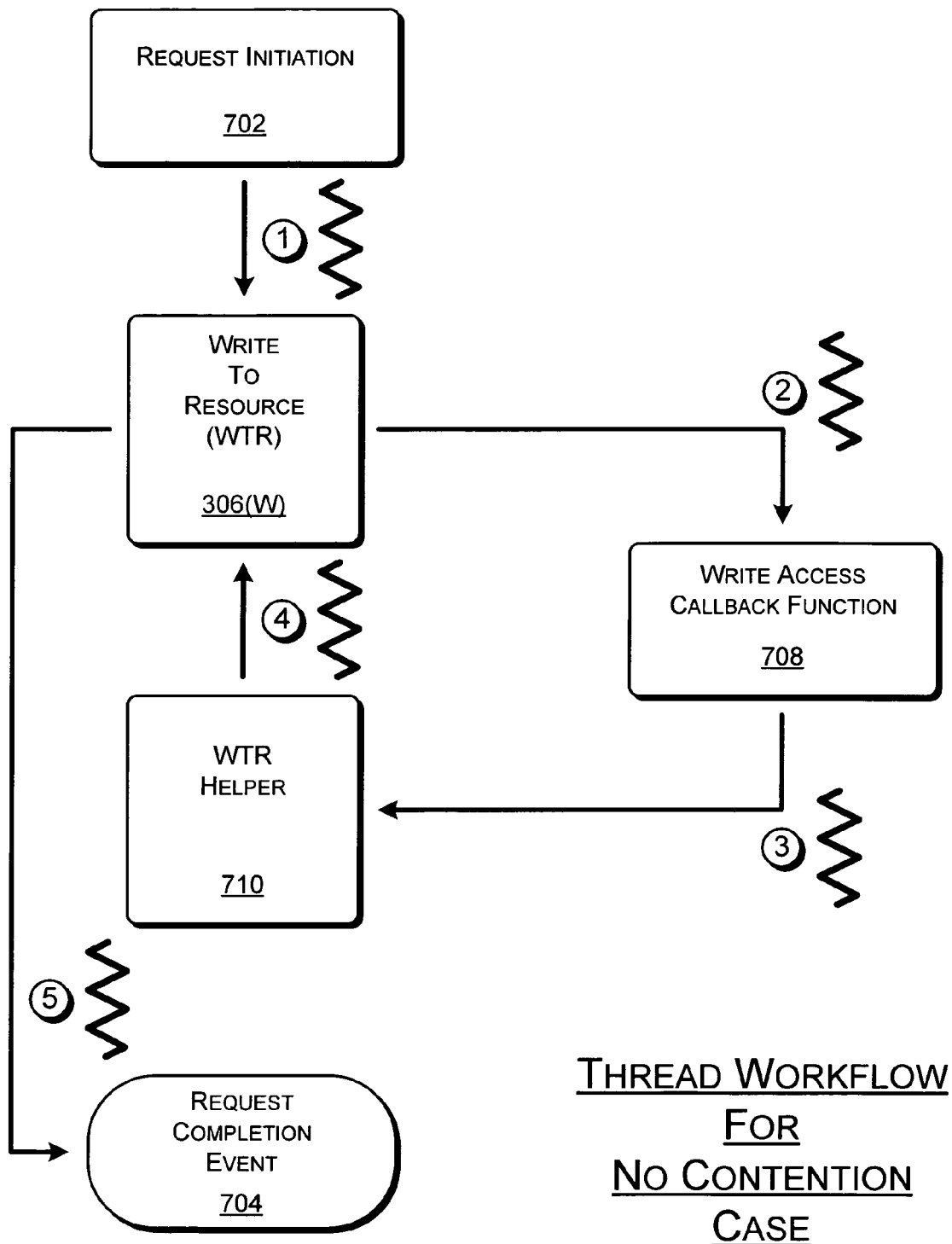
FIG. 8 is a block diagram example of resource locking for write accesses in a no contention case that is illustrated primarily from a function and thread perspective.

FIG. 8 is a block diagram example of resource locking for write accesses in a no contention case that is illustrated primarily from a function and thread perspective. After executing request initiation function 702 in response to receiving a write access request, the thread at (1) proceeds to execute write to resource 306(W). Write to resource 306(W) calls write access callback function 708 at (2). The thread executes write access callback function 708 by writing to the targeted resource.

At (3), the thread executes WTR helper 710, which checks whether there are any pending write access requests on a write request queue. At (4), the thread returns to write to resource 306(W). Afterwards, the thread executes request completion event 704 at (5).

As is apparent from the thread workflow that is illustrated in FIG. 8, a single thread is able to effectuate a write access request in the no contention case. It should be noted that in a real-world programming environment, returning functions return to the function that called them. Consequently, in accordance with commonly-applied programming practices, the thread may actually switch from executing write to resource 306(W) to WTR helper 710, which then calls write access callback function 708 so that write access callback function 708 can directly return to WTR helper 710.

Figure 9:
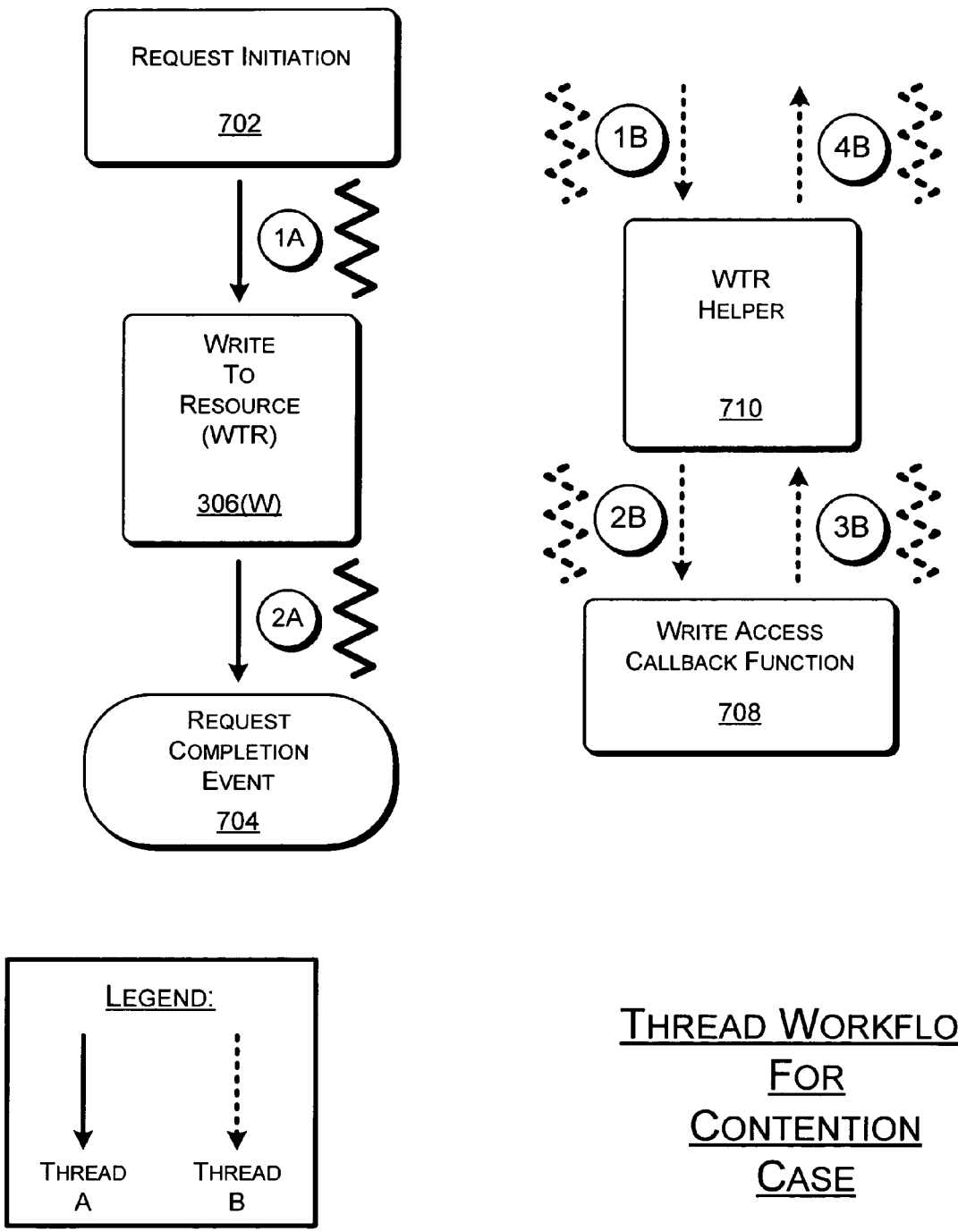
FIG. 9 is a block diagram example of resource locking for write accesses in a contention case that is illustrated primarily from a function and thread perspective.

FIG. 9 is a block diagram example of resource locking for write accesses in a contention case that is illustrated primarily from a function and thread perspective. After executing request initiation function 702 in response to receiving a write access request, a thread "A" at (1A) proceeds to execute write to resource 306(W). Write to resource 306(W) detects that the targeted resource is already locked, and it queues the write access request. At (2A), thread "A" executes request completion event 704.

When the queued write access request is retrieved, a thread "B" executes WTR helper 710 at (1B). WTR helper 710 calls write access callback function 708. At (2B), thread "B" executes write access callback function 708, which writes to the targeted resource. At (3B), write access callback function 708 returns to WTR helper 710. After executing WTR helper 710 (which may entail checking a queue of read and/or write access requests), thread "B" is finished with the write access request at (4B).

As is apparent from the thread workflow that is illustrated in FIG. 9, at least two different threads are involved in handling and ultimately completing or retiring a write access request in the contention case. In this sense, two different threads means at least that a thread performs work on behalf of an access request, performs some other work, and then comes back to perform additional work on behalf of the access request. This interpretation is especially true with a system employing a thread pool in which threads are assigned to functions that are queued up to the thread pool. In a thread throttled environment, a number of threads being assigned from the thread pool to functions is limited to the number of available CPUs on a device. This can reduce, if not prevent, context switching.

Reader/Writer Lock Implementation Example(s) with Respect to Functions and an Exemplary Detailed Algorithm A specific exemplary detailed algorithm is described in this section. However, reader/writer locking schemes may be implemented in alternative manners. Some alternative manners are described in preceding sections and/or noted as optional approaches in this section.

When a thread executing a function wants access to a resource, it calls an overall access API and passes to it the address of a callback function. If the resource is available, the calling thread calls the callback function, which manipulates the resource and returns. Thereafter, the access API returns. Therefore, in no contention scenarios, one thread can do all of the work. There is no thread contention, and performance is not adversely impacted by thread management overhead.

In a contention scenario, on the other hand, the address of the callback function is added to a queue and the access API returns immediately. Furthermore, the calling thread is not suspended waiting for the desired resource; consequently, the thread is free to do other work. When the thread that currently "owns" the resource returns from its callback method, the access API grabs the next callback out of the queue and executes it.

If a writer callback is being released, then the writer callback is queued up to a thread pool. (Alternatively, it can be executed on the same thread with likely lower ultimate performance.) Therefore, there is no contention for the CPU and performance is not adversely impacted. However, if reader callback(s) are being released, then multiple reader callbacks are queued to a thread pool. While this may seem like too many threads are attempting to run concurrently and possibly contending for the limited number of CPU(s), this would not be the case if the thread pool uses an I/O completion port (which is provided by certain Windows® operating systems from Microsoft® Corporation of Redmond, Wash.) because the I/O completion port only releases as many thread(s) as there are CPU(s) in the device. This prevents CPU contention and thread context switches; therefore, performance is not adversely impacted when handling multiple readers.

In addition to maintaining one or more access request queues, reader/writer locking schemes as described in this section also maintain state information as described below. Such a reader/writer locking scheme may be realized, for example, using a lock object having the following example state information:

[A] m_LockState (e.g., Int32)
Maintains current state of the lock using interlocked APIs
Possible states
[1] Free: No threads are currently using the lock.
[2] OwnedByWriter (OBW): One thread is writing.
[3] OwnedByReaders (OBR): One or more threads are reading.
[4] OwnedByReadersAndWritersPending (OBRAWP): Readers have the lock, but writer(s) want the lock.
[B] m_NumReadersReading (e.g., Int32)
Interlocked value that is incremented or decremented when a reader starts or stops, respectively.
[C] m_qWriters and m_qReaders (Queue<ReaderWriterLockCallback>)
FIFO queues of callback methods for write and read accesses that needs to be performed.

Although the above example state information is tailored for the .Net™ (which is a trademark of Microsoft® Corporation) environment, it can be modified for other environments, operating systems, computer languages, programming paradigms, and so forth. The example state information presented above is utilized in the following example methods with reference to the flow diagrams of FIGS. 10-13.

Figure 10:
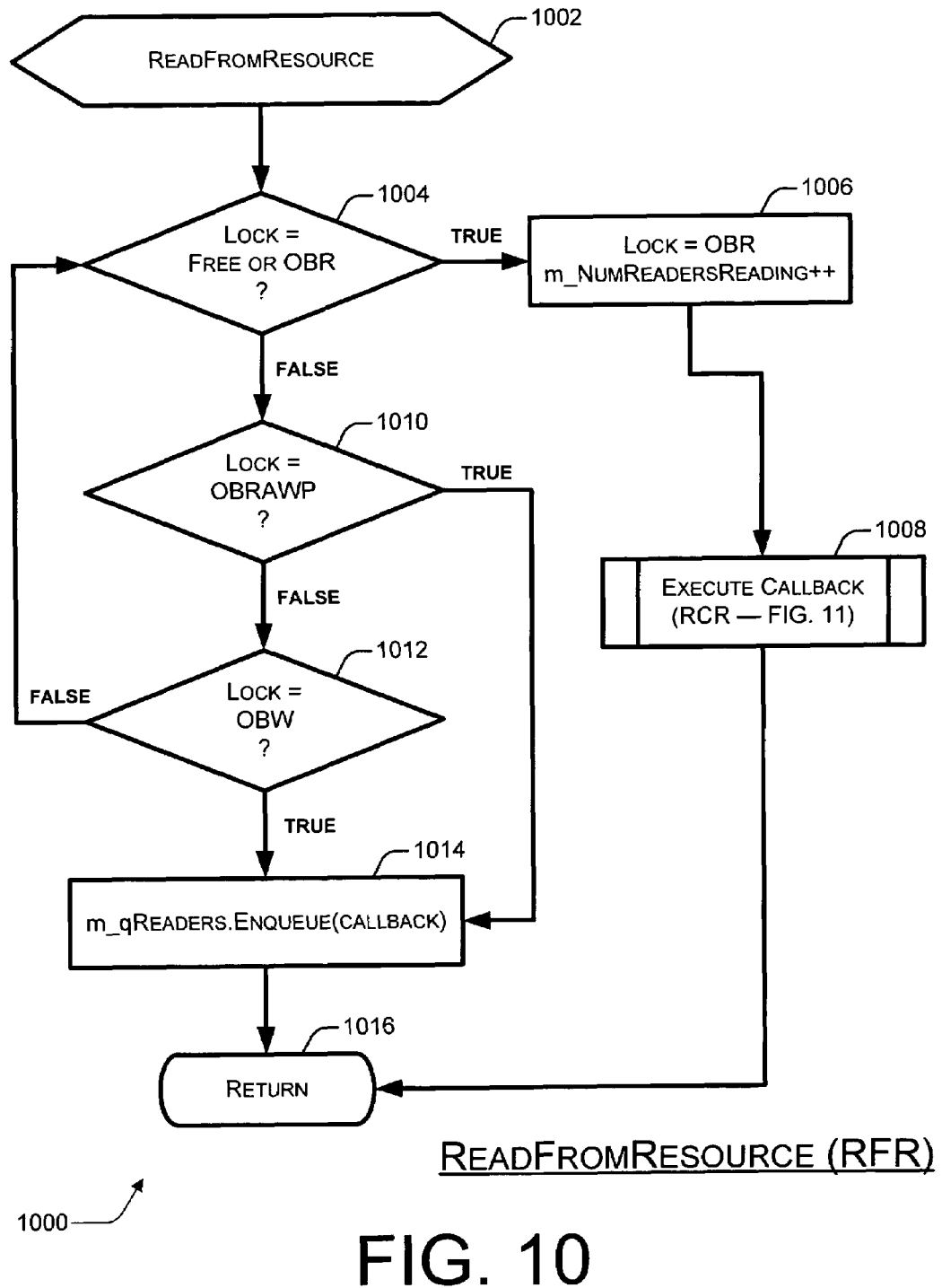
FIG. 10 is a flow diagram that illustrates an example of a method for reading from a resource in a reader/writer locking environment.

FIG. 10 is a flow diagram 1000 that illustrates an example of a method for reading from a resource in a reader/writer locking environment. Flow diagram 1000 includes eight (8) blocks 1002-1016. At block 1002, a read from resource method/function is executed. At block 1004, it is determined if the lock is free or OBR. If the lock is free or OBR, then at block 1006 the lock is set equal to OBR (in case it was previously free), and the value of m_NumReadersReading is incremented. At block 1008, a callback is executed. Specifically, a reader callback return method is executed as described further herein below with particular reference to FIG. 11. After executing the callback, the overall method returns at block 1016.

If, on the other hand, the lock is determined to be neither free nor OBR (at block 1004), then at block 1010 it is determined if the lock is OBRAWP. If true the lock is OBRAWP, then the read request is queued up at block 1014 as indicated by "m_qReaders.Enqueue(callback)". After enqueuing the read request, the overall method returns at block 1016. If the lock is not set to OBRAWP (as determined at block 1010), then at block 1012 it is determined if the lock is OBW. If the lock is determined to be OBW, then the read request is queued up at block 1014. If the lock is not determined to be OBW (at block 1012), then the method of flow diagram 1000 continues at block 1004 (e.g., to check if the lock has recently been freed).

Figure 11:
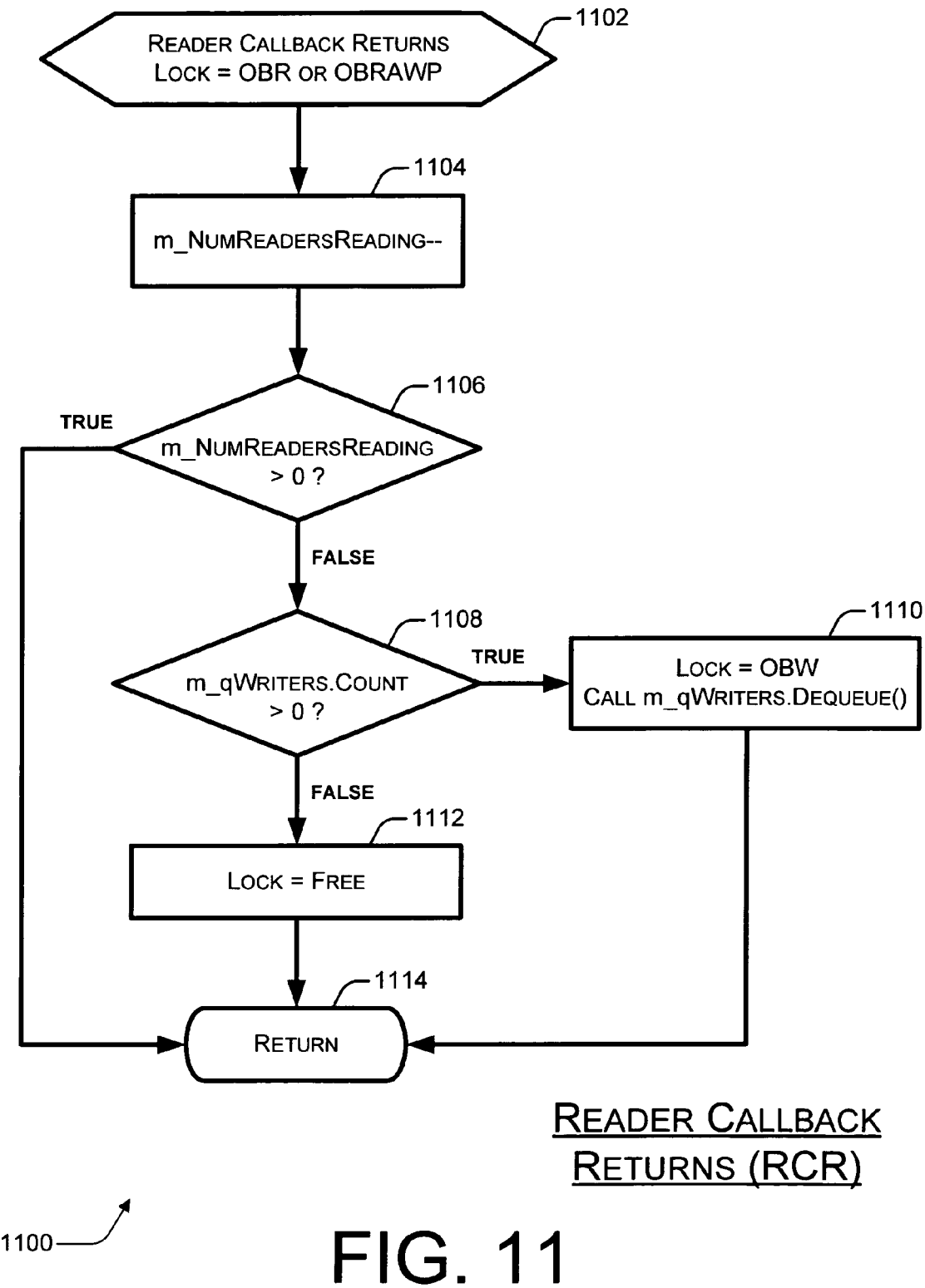
FIG. 11 is a flow diagram that illustrates an example of a method for reader callback returns in a reader/writer locking environment.

FIG. 11 is a flow diagram 1100 that illustrates an example of a method for reader callback returns in a reader/writer locking environment. Flow diagram 1100 includes seven (7) blocks 1102-1114. At block 1102, the reader callback returns method/function is executed when the lock is equal to OBR or OBRAWP. At block 1104, the value of m_NumReadersReading is decremented. At block 1106, it is determined if the value of m_NumReadersReading is greater than zero. If so, then the overall method returns at block 1114.

If, on the other hand, the value of m_NumReadersReading is not greater than zero (as determined at block 1106), then at block 1108 it is determined if the value of m_qWriters.Count is greater than zero. If it is greater than zero, then at block 1110 the lock is set equal to OBW, and a write request is retrieved from the write queue as indicated by "Call m_qWriters.Dequeue( )". The overall method then returns at block 1114. If, on the other hand, the value of m_qWriters.Count is not greater than zero (as determined at block 1108), then at block 1112 the lock is set to free. The overall method then returns at block 1114.

Figure 12:
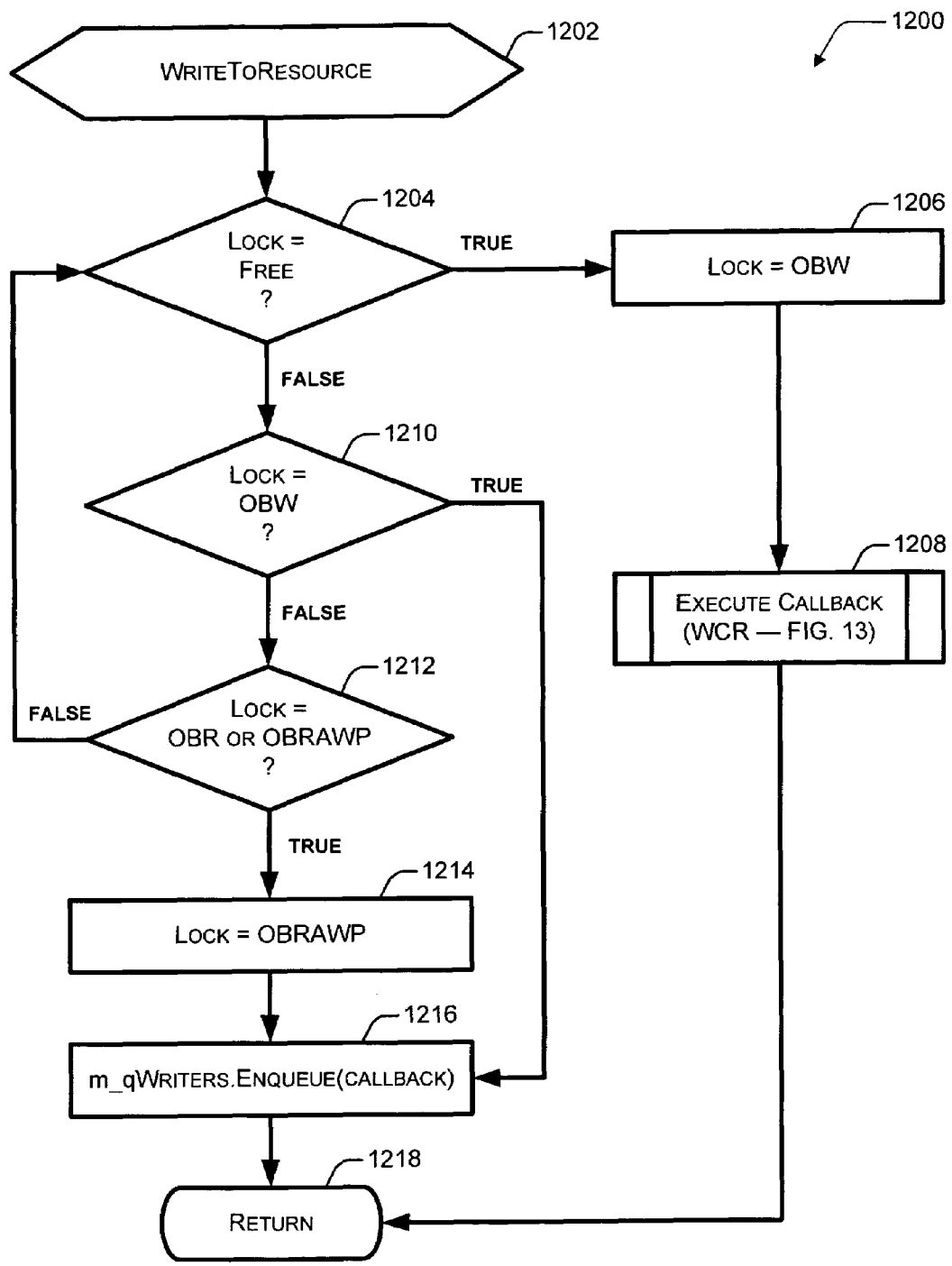
FIG. 12 is a flow diagram that illustrates an example of a method for writing to a resource in a reader/writer locking environment.

FIG. 12 is a flow diagram 1200 that illustrates an example of a method for writing to a resource in a reader/writer locking environment. Flow diagram 1200 includes nine (9) blocks 1202-1218. At block 1202, a write to resource method/function is executed. At block 1204, it is determined if the lock is free. If the lock is free, then at block 1206 the lock is set equal to OBW. At block 1208, a callback is executed. Specifically, a writer callback return method is executed as described further herein below with particular reference to FIG. 13. After executing the callback, the overall method returns at block 1218.

If, on the other hand, the lock is determined to not be free (at block 1204), then at block 1210 it is determined if the lock is OBW. If true the lock is OBW, then the write request is queued up at block 1216 as indicated by "m_qWriters.Enqueue(callback)". After enqueuing the write request, the overall method returns at block 1218. If, on the other hand, the lock is not set to OBW (as determined at block 1210), then at block 1212 it is determined if the lock is either OBR or OBRAWP.

If the lock is determined to be either OBR or OBRAWP (at block 1212), then at block 1214 the lock is set to OBRAWP (in case it was previously OBR), and the write request is queued up at block 1216. If the lock is determined to be neither OBR nor OBRAWP (at block 1212), then the method of flow diagram 1200 continues at block 1204 (e.g., to check if the lock has recently been freed).

Figure 13:
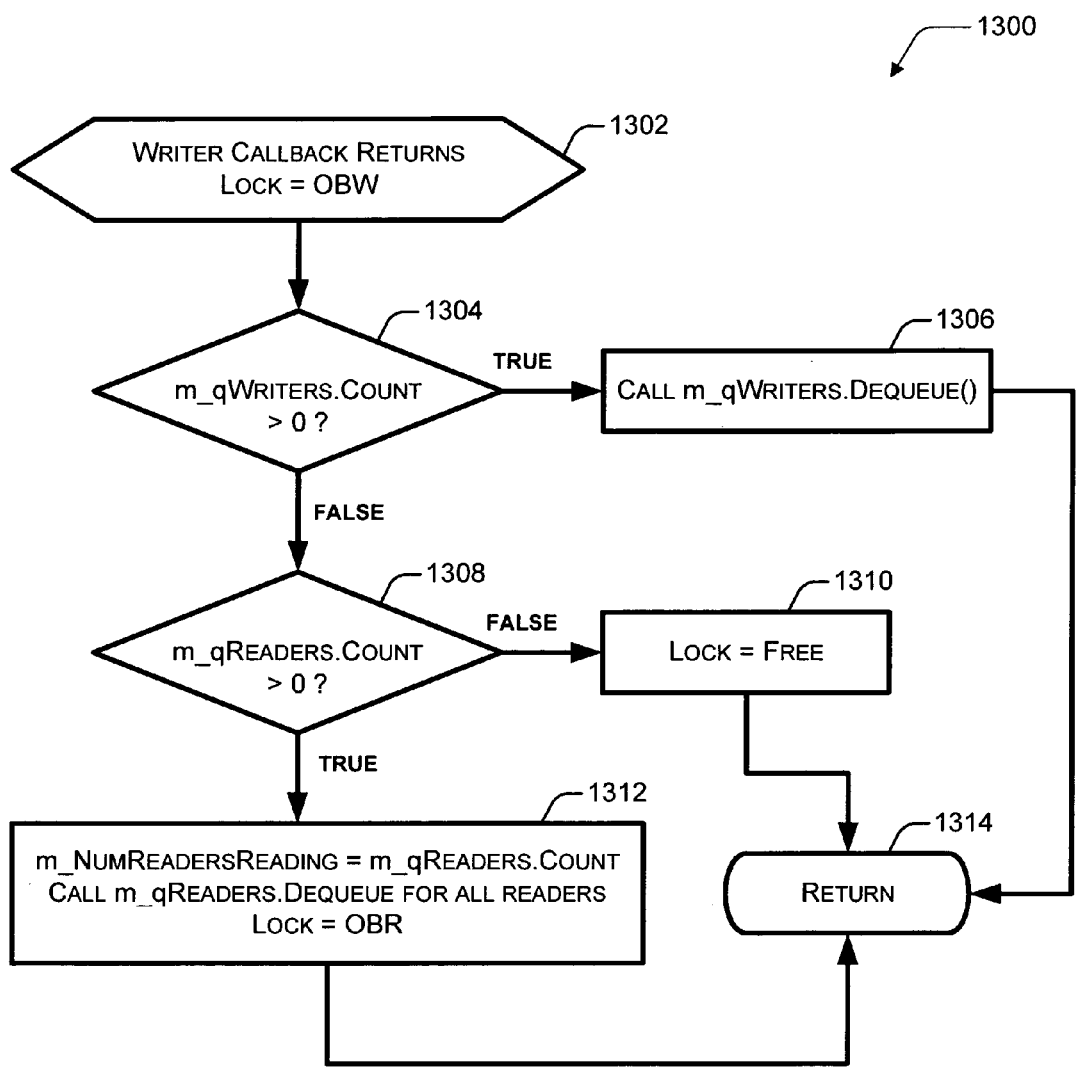
FIG. 13 is a flow diagram that illustrates an example of a method for writer callback returns in a reader/writer locking environment.

FIG. 13 is a flow diagram 1300 that illustrates an example of a method for writer callback returns in a reader/writer locking environment. Flow diagram 1300 includes seven (7) blocks 1302-1314. At block 1302, the writer callback returns method/function is executed when the lock is equal to OBW. At block 1304, it is determined if the value of m_qWriters.Count is greater than zero. If so, then a write request is dequeued as indicated by "Call m_qWriters.Dequeue( )". Thereafter, the overall method returns at block 1314.

If, on the other hand, the value of m_qWriters.Count is not greater than zero (as determined at block 1304), then at block 1308 it is determined if the value of m_qReaders.Count is greater than zero. If it is greater than zero, then at block 1312 (i) the lock is set equal to OBR, (ii) m_NumReadersReading is set equal to m_qReaders.Count, and (iii) all read requests are retrieved from the read queue as indicated by "Call m_qReaders.Dequeue for all readers". The overall method then returns at block 1314. If, on the other hand, the value of m_qReaders.Count is not greater than zero (as determined at block 1308), then at block 1310 the lock is set to free. The overall method then returns at block 1314.

Optionally, system efficiency can be further enhanced by employing one or more of the following thread utilization strategy examples. For no contention scenarios, the thread calling the API can execute the callback too. In other words, one thread can execute all of the functions to effectuate a (e.g., read or write) access. Consequently, it is a fast mechanism, and no context switch is involved. If readers already own the lock, and the thread wants to read, the thread can proceed to read from the resource. For contention scenarios, the callback method is queued; therefore, the thread can return essentially immediately so that it can perform other work because the locking mechanism does not put the thread into a wait state.

When handling callback method returns, thread utilization strategy examples can also be employed. During writer callback method returns, if there is at least one more writer in the write request queue, then the thread executes the next writer without involving a context switch. If there are no more writers in the write request queue, reader callback methods are queued to a thread pool. The thread pools wakes and assigns a number of threads that is equal to a number of available CPUs to process the read requests that are in the read request queue. Because the number of threads is throttled with regard to the number of available CPUs, no context switching results. During reader callback method returns, after a given thread completes execution of a final reader callback method return, the given thread then executes a first writer callback method return without involving a context switch.

As described above, access request queue(s) can be implemented in alternative manners. Example alternative manners include one queue for all (e.g., undifferentiated) access requests, one combined queue for read and write access requests, a separate queue for read requests and a separate queue for write requests, and so forth. The manner in which requests are retrieved and/or drained from such queue(s) is also variable. Alternative examples include: (i) retrieving and completing only one write request (or a predetermined number of write requests greater than one) before returning to the read request queue and (ii) retrieving and completing only a limited number of read requests before returning to the write request queue (e.g., because even with concurrency a large number of read requests are handled somewhat sequentially because of the non-infinite number of CPUs). Other factors may also be considered, such as the length of time an access request has been queued up (regardless of whether it is a write or read request), relative priorities of read and write requests at a group level and/or for individual requests, and so forth.

By way of further explanation and example only, the description herein above in this section that references FIGS. 10-13 may be modified for implementation(s) that do not differentiate between read and write requests. Such implementation(s) lock the resource for any accessing. There is less state information to be maintained and one (public) API fewer. Also, the states become free and OBW (which may be reconsidered as and renamed as owned by accesser (OBA)).

Modifications include eliminating the separate functions for reading, which are read from resource (RFR) of FIG. 10 and reader callback returns (RCR) of FIG. 11. Also, blocks 1212 and 1214 of FIG. 12 are not relevant and may be omitted for implementation(s) that do not bifurcate read and write accesses. In FIG. 13, blocks 1308 and 1312 are not relevant and may be omitted. The counts, queues, etc. may also be reconsidered and renamed such that "access" or similar replaces "write".

The devices, actions, aspects, features, functions, procedures, modules, components, etc. of FIGS. 3-13 are illustrated in diagrams that are divided into multiple blocks. However, the order, interconnections, interrelationships, layout, etc. in which FIGS. 3-13 are described and/or shown is not intended to be construed as a limitation, and any number of the blocks can be modified, combined, rearranged, augmented, omitted, etc. in any manner to implement one or more systems, methods, devices, procedures, media, apparatuses, APIs, arrangements, etc. for resource accessing with locking. Furthermore, although the description herein includes references to specific implementations (including a general device of FIG. 14), the illustrated and/or described implementations can be implemented in any suitable hardware, software, firmware, or combination thereof and using any suitable threaded operating environment(s), resource(s), user function(s), programming paradigm(s), API division(s), access request queue division(s) and/or organization(s), and so forth.

Example Operating Environment For Computer or Other Device

Figure 14:
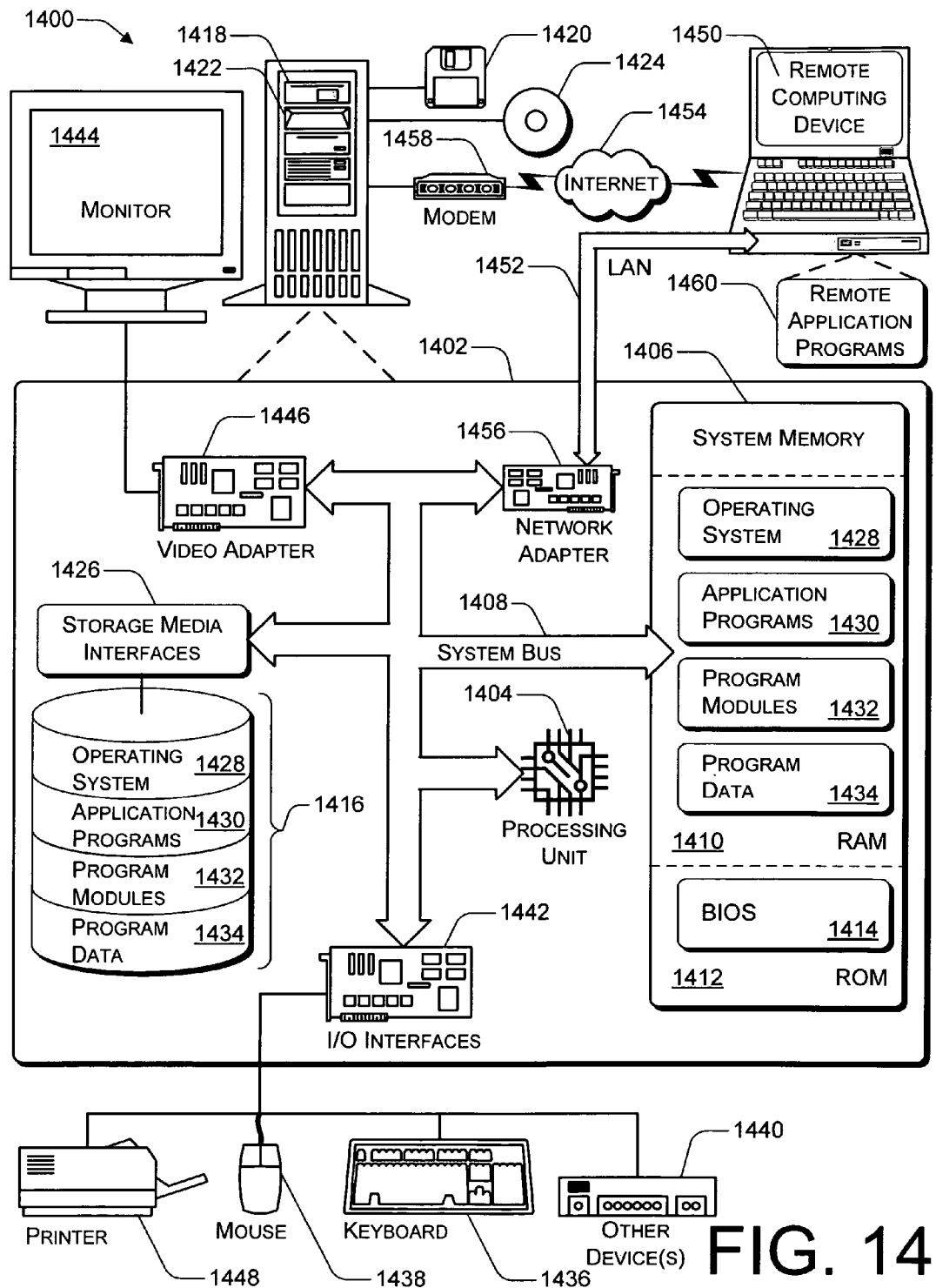
FIG. 14 illustrates an example of a computing (or general device) operating environment that is capable of (wholly or partially) implementing at least one aspect of resource accessing with locking as described herein.

FIG. 14 illustrates an example computing (or general device) operating environment 1400 that is capable of (fully or partially) implementing at least one system, device, apparatus, component, arrangement, protocol, approach, method, procedure, media, application programming interface (API), some combination thereof, etc. for resource accessing with locking as described herein. Operating environment 1400 may be utilized in the computer and network architectures described below.

Example operating environment 1400 is only one example of an environment and is not intended to suggest any limitation as to the scope of use or functionality of the applicable device (including computer, network node, entertainment device, mobile appliance, general electronic device, etc.) architectures. Neither should operating environment 1400 (or the devices thereof) be interpreted as having any dependency or requirement relating to any one or to any combination of components as illustrated in FIG. 14.

Additionally, implementations for resource accessing with locking may be realized with numerous other general purpose or special purpose device (including computing system) environments or configurations. Examples of well known devices, systems, environments, and/or configurations that may be suitable for use include, but are not limited to, personal computers, server computers, thin clients, thick clients, personal digital assistants (PDAs) or mobile telephones, watches, hand-held or laptop devices, multiprocessor systems, microprocessor-based systems, set-top boxes, programmable consumer electronics, video game machines, game consoles, portable or handheld gaming units, network PCs, videoconferencing equipment, minicomputers, mainframe computers, network nodes, distributed or multi-processing computing environments that include any of the above systems or devices, some combination thereof, and so forth.

Implementations of resource accessing with locking may be described in the general context of processor-executable instructions. Generally, processor-executable instructions include routines, programs, protocols, objects, functions, interfaces, components, data structures, etc. that perform and/or enable particular tasks and/or implement particular abstract data types. Locking resource accessing realizations, as described in certain implementations herein, may also be practiced in distributed processing environments where tasks are performed by remotely-linked processing devices that are connected through a communications link and/or network. Especially but not exclusively in a distributed computing environment, processor-executable instructions may be located in separate storage media, executed by different processors, and/or propagated over transmission media.

Example operating environment 1400 includes a general-purpose computing device in the form of a computer 1402, which may comprise any (e.g., electronic) device with computing/processing capabilities. The components of computer 1402 may include, but are not limited to, one or more processors or processing units 1404, a system memory 1406, and a system bus 1408 that couples various system components including processor 1404 to system memory 1406.

Processors 1404 are not limited by the materials from which they are formed or the processing mechanisms employed therein. For example, processors 1404 may be comprised of semiconductor(s) and/or transistors (e.g., electronic integrated circuits (ICs)). In such a context, processor-executable instructions may be electronically-executable instructions. Alternatively, the mechanisms of or for processors 1404, and thus of or for computer 1402, may include, but are not limited to, quantum computing, optical computing, mechanical computing (e.g., using nanotechnology), and so forth.

System bus 1408 represents one or more of any of many types of wired or wireless bus structures, including a memory bus or memory controller, a point-to-point connection, a switching fabric, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, some combination thereof, and so forth.

Computer 1402 typically includes a variety of processor-accessible media. Such media may be any available media that is accessible by computer 1402 or another (e.g., electronic) device, and it includes both volatile and non-volatile media, removable and non-removable media, and storage and transmission media.

System memory 1406 includes processor-accessible storage media in the form of volatile memory, such as random access memory (RAM) 1410, and/or non-volatile memory, such as read only memory (ROM) 1412. A basic input/output system (BIOS) 1414, containing the basic routines that help to transfer information between elements within computer 1402, such as during start-up, is typically stored in ROM 1412. RAM 1410 typically contains data and/or program modules/instructions that are immediately accessible to and/or being presently operated on by processing unit 1404.

Computer 1402 may also include other removable/non-removable and/or volatile/non-volatile storage media. By way of example, FIG. 14 illustrates a hard disk drive or disk drive array 1416 for reading from and writing to a (typically) non-removable, non-volatile magnetic media (not separately shown); a magnetic disk drive 1418 for reading from and writing to a (typically) removable, non-volatile magnetic disk 1420 (e.g., a "floppy disk"); and an optical disk drive 1422 for reading from and/or writing to a (typically) removable, non-volatile optical disk 1424 such as a CD, DVD, or other optical media. Hard disk drive 1416, magnetic disk drive 1418, and optical disk drive 1422 are each connected to system bus 1408 by one or more storage media interfaces 1426. Alternatively, hard disk drive 1416, magnetic disk drive 1418, and optical disk drive 1422 may be connected to system bus 1408 by one or more other separate or combined interfaces (not shown).

The disk drives and their associated processor-accessible media provide non-volatile storage of processor-executable instructions, such as data structures, program modules, and other data for computer 1402. Although example computer 1402 illustrates a hard disk 1416, a removable magnetic disk 1420, and a removable optical disk 1424, it is to be appreciated that other types of processor-accessible media may store instructions that are accessible by a device, such as magnetic cassettes or other magnetic storage devices, flash memory, compact disks (CDs), digital versatile disks (DVDs) or other optical storage, RAM, ROM, electrically-erasable programmable read-only memories (EEPROM), and so forth. Such media may also include so-called special purpose or hard-wired IC chips. In other words, any processor-accessible media may be utilized to realize the storage media of the example operating environment 1400.

Any number of program modules (or other units or sets of processor-executable instructions) may be stored on hard disk 1416, magnetic disk 1420, optical disk 1424, ROM 1412, and/or RAM 1410, including by way of general example, an operating system 1428, one or more application programs 1430, other program modules 1432, and program data 1434. These processor-executable instructions may include, for example, one or more of: a resource to be accessed, an access request, a lock-related function or API, state information for a locking scheme, some combination thereof, and so forth.

A user may enter commands and/or information into computer 1402 via input devices such as a keyboard 1436 and a pointing device 1438 (e.g., a "mouse"). Other input devices 1440 (not shown specifically) may include a microphone, joystick, game pad, satellite dish, serial port, video camera, scanner, and/or the like. These and other input devices are connected to processing unit 1404 via input/output interfaces 1442 that are coupled to system bus 1408. However, input devices and/or output devices may instead be connected by other interface and bus structures, such as a parallel port, a game port, a universal serial bus (USB) port, an infrared port, an IEEE 1394 ("Firewire") interface, an IEEE 802.11 wireless interface, a Bluetooth® wireless interface, and so forth.

A monitor/view screen 1444 or other type of display device may also be connected to system bus 1408 via an interface, such as a video adapter 1446. Video adapter 1446 (or another component) may be or may include a graphics card for processing graphics-intensive calculations and for handling demanding display requirements. Typically, a graphics card includes a graphics processing unit (GPU), video RAM (VRAM), etc. to facilitate the expeditious display of graphics and performance of graphics operations. In addition to monitor 1444, other output peripheral devices may include components such as speakers (not shown) and a printer 1448, which may be connected to computer 1402 via input/output interfaces 1442.

Computer 1402 may operate in a networked environment using logical connections to one or more remote computers, such as a remote computing device 1450. By way of example, remote computing device 1450 may be a peripheral device, a personal computer, a portable computer (e.g., laptop computer, tablet computer, PDA, mobile station, etc.), a palm or pocket-sized computer, a watch, a gaming device, a server, a router, a network computer, a peer device, another network node, or another device type as listed above, and so forth. However, remote computing device 1450 is illustrated as a portable computer that may include many or all of the elements and features described herein with respect to computer 1402.

Logical connections between computer 1402 and remote computer 1450 are depicted as a local area network (LAN) 1452 and a general wide area network (WAN) 1454. Such networking environments are commonplace in offices, enterprise-wide computer networks, intranets, the Internet, fixed and mobile telephone networks, ad-hoc and infrastructure wireless networks, mesh networks, other wireless networks, gaming networks, some combination thereof, and so forth. Such networks and logical and physical communications connections are additional examples of transmission media.

When implemented in a LAN networking environment, computer 1402 is usually connected to LAN 1452 via a network interface or adapter 1456. When implemented in a WAN networking environment, computer 1402 typically includes a modem 1458 or other component for establishing communications over WAN 1454. Modem 1458, which may be internal or external to computer 1402, may be connected to system bus 1408 via input/output interfaces 1442 or any other appropriate mechanism(s). It is to be appreciated that the illustrated network connections are examples and that other manners for establishing communication link(s) between computers 1402 and 1450 may be employed.

In a networked environment, such as that illustrated with operating environment 1400, program modules or other instructions that are depicted relative to computer 1402, or portions thereof, may be fully or partially stored in a remote media storage device. By way of example, remote application programs 1460 reside on a memory component of remote computer 1450 but may be usable or otherwise accessible via computer 1402. Also, for purposes of illustration, application programs 1430 and other processor-executable instructions such as operating system 1428 are illustrated herein as discrete blocks, but it is recognized that such programs, components, and other instructions reside at various times in different storage components of computing device 1402 (and/or remote computing device 1450) and are executed by processor(s) 1404 of computer 1402 (and/or those of remote computing device 1450).

Although systems, media, devices, methods, procedures, apparatuses, techniques, schemes, approaches, procedures, arrangements, and other implementations have been described in language specific to structural, logical, algorithmic, and functional features and/or diagrams, it is to be understood that the invention defined in the appended claims is not necessarily limited to the specific features or diagrams described. Rather, the specific features and diagrams are disclosed as exemplary forms if implementing the claimed invention.

What is claimed is:

1. A system for thread handling, the system comprising:
   at least one processor;
   a target resource;
   a first thread to handle a first access request to at least the target resource; and
   a resource locking mechanism to release the first thread during the handling of the first access request for the target resource when the resource locking mechanism determines that the target resource is already locked for access by a write access request, so that the released first thread is capable of handling at least a second access request,
   and to permit the first access request handled by the first thread to access the target resource when the resource locking mechanism determines that the first access request is a first read access request and the target resource is already locked for access by a second read access request a second thread to handle a second access request to at least the target resource, wherein the resource locking mechanism is to permit the second access request handled by the second thread to access the target resource when the resource locking mechanism determines that the second access request is third read access request and the target resource is already locked for access by the second read access request.

2. The system as recited in claim 1, wherein the resource locking mechanism is further configured to queue the first access request when the target resource is already locked for access by the write access request.

3. The system as recited in claim 2, wherein the resource locking mechanism is further configured (i) to retrieve the queued first access request when the target resource is no longer locked for access by the write access request and (ii) to fulfill the retrieved first access request.

4. The system as recited in claim 3, wherein the resource locking mechanism is further configured (i) to retrieve multiple queued read access requests when the targeted resource is no longer locked and (ii) to assign a determinable number of threads to a subset of read access requests of the retrieved multiple read access requests, the determinable number equal to a number of available processors of the system.

5. The system as recited in claim 2, wherein the resource locking mechanism is further configured to queue the first access request on at least one access request queue by adding an access request identifier to the at least one access request queue.

6. The system as recited in claim 1, wherein the target resource comprises at least one of a file, a database, an object, a class, a document, a printer, a network connection, a video processor, or a video display screen.

7. One or more processor-accessible storage media comprising processor-executable instructions that include at least one application programming interface (API), the at least one API to handle access requests for a resource; the at least one API to
   queue a first access request and to release a first thread executing the first access request without suspending the first thread when the resource is already write locked, and to permit the first access request to be performed on the resource when the first access request is a read access request and the resource is already read locked, and
   permit a second access request that is executed by a second thread to access the resource when the second access request is a second read access request and the resource is already read locked.

8. The one or more processor-accessible storage media as recited in claim 7, wherein the at least one API is to further queue access requests that are write access requests when the resource is already write locked.

9. The one or more processor-accessible storage media as recited in claim 7, wherein the at least one API is to further queue access requests that are read access requests when a write is occurring to the resource.

10. The one or more processor-accessible storage media as recited in claim 9, wherein the at least one API is to further permit new access requests that are read access requests to be concurrently performed with previous read access requests when no write access request is pending for the resource.

11. The one or more processor-accessible storage media as recited in claim 7, wherein the at least one API is to further retrieve the queued first access request and to permit performance of the retrieved first access request when the resource is no longer write locked.

12. The one or more processor-accessible storage media as recited in claim 11, wherein the at least one API is to further retrieve multiple queued read access requests when contention caused by one or more write accesses is terminated; and wherein the at least one API is to further assign a determinable number of threads to a subset of read access requests of the retrieved multiple read access requests, the determinable number equal to a number of available processors.

13. The one or more processor-accessible storage media as recited in claim 7, wherein the at least one API comprises at least two APIs; and wherein the at least two APIs comprise a read locking API that handles read access requests and a write locking API that handles write access requests.

14. The one or more processor-accessible storage media as recited in claim 13, wherein the read locking API is further (i) to queue read access requests in a read access request queue when the resource is already locked for a write access request and (ii) to permit concurrent read access requests; and wherein the write locking API is to queue write access requests in a write access request queue when the resource is already locked for a write access request or one or more read access requests.

15. A method implemented by a device, the method comprising:
- starting, by a first thread, performance of a first access request that is targeting a resource;
- detecting, by the first thread, that the resource is already locked for a read access or a write access by a second thread;
- performing, by the first thread, the first access request when the resource is already locked for the read access by the second thread and the first access request is a read access request;
- queuing, by the first thread, the first access request when the resource is already locked for the write access by the second thread;
- completing, by a third thread, performance of the first access request when the resource is no longer locked for write access by the second thread, and
- performing, by a fourth thread, a second access request that is targeting the resource when the resource is already locked for the read access by the second thread and the second access request is another read access request.

16. The device-implemented method as recited in claim 15, wherein the queuing comprises queuing the first access request by adding an access request identifier associated with the access request to at least one access request queue; wherein the access request identifier comprises at least one of a code, a pointer, an address, a function name, or a function location.

17. The device-implemented method as recited in claim 15, wherein the completing comprises:
- retrieving the queued first access request from at least one access request queue; and
- performing the first access request by accessing the resource in accordance with the first access request.

18. The device-implemented method as recited in claim 17, further comprising:
- retrieving multiple read access requests from the at least one access request queue; and
- assigning a determinable number of threads to a subset of read access requests of the retrieved multiple read access requests, the determinable number equal to a number of available processors.

19. The device-implemented method as recited in claim 15, wherein the first thread differs from the third thread at least to an extent such that an identifiable thread performs other work between when it executes at least one function as the first thread and when it executes at least one function as the third thread.

* * * * *